US007705845B1

United States Patent
Parikh et al.

(10) Patent No.: US 7,705,845 B1
(45) Date of Patent: Apr. 27, 2010

(54) CLIPPING GRAPHICS PRIMITIVES WITH DEFERRED DERIVATION OF VERTEX ATTRIBUTES

(75) Inventors: Vimal S. Parikh, Fremont, CA (US); Henry Packard Moreton, Woodside, CA (US); Andrew J. Tao, San Francisco, CA (US)

(73) Assignee: NVIDIA Corporation, Santa Clara, CA (US)

( * ) Notice: Subject to any disclaimer, the term of this patent is extended or adjusted under 35 U.S.C. 154(b) by 732 days.

(21) Appl. No.: 11/445,726

(22) Filed: Jun. 1, 2006

(51) Int. Cl.
*G06T 15/40* (2006.01)
(52) U.S. Cl. .................. 345/421; 345/423; 345/426; 345/581; 345/582; 345/583; 5/620; 5/622; 5/623; 5/624
(58) Field of Classification Search .......... 345/421, 345/426, 522, 423, 581, 582, 583, 620, 622, 345/623, 624
See application file for complete search history.

(56) References Cited

U.S. PATENT DOCUMENTS

| 5,777,625 | A | 7/1998 | Rossin |
| 6,459,438 | B1 | 10/2002 | Mang |
| 6,507,348 | B1 | 1/2003 | Mang et al. |
| 6,512,524 | B1 | 1/2003 | Mang |
| 6,686,924 | B1 * | 2/2004 | Mang et al. ............ 345/620 |
| 7,215,344 | B2 * | 5/2007 | Baldwin ............... 345/620 |
| 2002/0030693 | A1 | 3/2002 | Baldwin |

* cited by examiner

*Primary Examiner*—Kimbinh T Nguyen
(74) *Attorney, Agent, or Firm*—Cooley Godward Kronish LLP

(57) ABSTRACT

Apparatus, system, and method for clipping graphics primitives are described. In one embodiment, a graphics processing apparatus includes a clipping engine and an output unit connected to the clipping engine. The clipping engine is configured to clip an input graphics primitive with respect to a set of clipping planes to derive spatial attributes of new vertices. The output unit is configured to identify a subset of the new vertices that defines an output graphics primitive, and the output unit is configured to derive non-spatial attributes of the subset of the new vertices to produce the output graphics primitive.

14 Claims, 3 Drawing Sheets

CLIPPING GRAPHICS PRIMITIVES WITH DEFERRED DERIVATION OF VERTEX ATTRIBUTES

BRIEF DESCRIPTION OF THE INVENTION

The invention relates generally to graphics processing. More particularly, the invention relates to an apparatus, system, and method for clipping graphics primitives with deferred derivation of vertex attributes.

BACKGROUND OF THE INVENTION

In conventional graphics processing systems, an object to be displayed is typically represented as a set of one or more graphics primitives. Examples of graphics primitives include one-dimensional graphics primitives, such as lines, and two-dimensional graphics primitives, such as polygons. Typically, a graphics primitive is defined by a set of vertices each having a number of attributes. For example, a graphics primitive can be a triangle that is defined by three vertices, and each of the vertices can have up to 128 attributes, such as spatial coordinates, color components, fog components, specularity components, and texture coordinates.

Conventional graphics processing systems sometimes implement techniques for clipping graphics primitives. Clipping typically refers to a set of operations that determine which portions of an object are to be displayed with respect to a set of clipping planes. Various techniques have been developed for clipping graphics primitives. Examples of these techniques include the Cohen-Sutherland technique, the Liang-Barsky technique, the Sutherland-Hodgeman technique, and the Weiler technique. Clipping a polygon with respect to a set of clipping planes can produce a number of new vertices, some of which are eventually clipped away and discarded. For example, clipping a triangle with respect to six clipping planes can produce up to 9 new vertices, while clipping the same triangle with respect to 14 clipping planes can produce up to 17 new vertices.

Conventional clipping techniques can be computationally intensive, particularly when clipping polygons with respect to multiple clipping planes. In the case of the Sutherland-Hodgeman technique, clipping with respect to each clipping plane can involve a number of interpolation operations to derive attributes of a new vertex that is produced. Indeed, one significant drawback of the Sutherland-Hodgeman technique is that this technique typically derives all attributes of each new vertex that is produced, even if that new vertex is eventually clipped away and discarded. For example, if each vertex has 128 attributes, derivation of all attributes can involve 128 separate interpolation operations for each new vertex that is produced. As a result of this drawback, the Sutherland-Hodgeman technique can lead to inefficiencies in terms of performing unnecessary interpolation operations, which can translate into a processing time that is longer than desired. In addition, such inefficiencies can translate into an enhanced buffering size requirement to accommodate all attributes of each new vertex that is produced. For example, if each new vertex has 128 attributes each being a 32 bit word, the buffering size requirement can be (17×128×32) when clipping with respect to 14 clipping planes.

It is against this background that a need arose to develop the apparatus, system, and method described herein.

SUMMARY OF THE INVENTION

In one aspect, the invention relates to a graphics processing apparatus. In one embodiment, the graphics processing apparatus includes a clipping engine and an output unit connected to the clipping engine. The clipping engine is configured to clip an input graphics primitive with respect to a set of clipping planes to derive spatial attributes of new vertices. The output unit is configured to identify a subset of the new vertices that defines an output graphics primitive, and the output unit is configured to derive non-spatial attributes of the subset of the new vertices to produce the output graphics primitive.

In another embodiment, the graphics processing apparatus includes a clipping module. The clipping module is configured to clip an input graphics primitive with respect to a set of clipping planes to derive spatial attributes of a first new vertex and spatial attributes of a second new vertex. The clipping module is also configured to determine whether the first new vertex defines an output graphics primitive. The clipping module is further configured to, based on determining that the first new vertex defines the output graphics primitive, derive remaining attributes of the first new vertex.

In another aspect, the invention relates to a graphics processing method. In one embodiment, the graphics processing method includes clipping an input graphics primitive with respect to a viewing region to derive spatial attributes of new vertices. The graphics processing method also includes selecting a subset of the new vertices based on a positioning of the subset of the new vertices with respect to the viewing region. The graphics processing method further includes deriving non-spatial attributes of the subset of the new vertices to produce an output graphics primitive.

Advantageously, embodiments of the invention operate in accordance with an improved technique for clipping graphics primitives with respect to a set of clipping planes. In particular, the improved technique allows derivation of certain attributes to be deferred until clipping has been performed with respect to most or all of the clipping planes. By deferring derivation of certain attributes, a complete set of attributes can be derived for a particular new vertex if that new vertex is to be retained, while a complete set of attributes need not be derived for another new vertex if that new vertex is to be discarded. In such manner, the improved technique can provide enhanced efficiency in terms of avoiding or reducing unnecessary operations that might otherwise be performed, thus resulting in a shorter processing time and a reduced buffering size requirement.

Other aspects and embodiments of the invention are also contemplated. The foregoing summary and the following detailed description are not meant to restrict the invention to any particular embodiment but are merely meant to describe some embodiments of the invention.

BRIEF DESCRIPTION OF THE DRAWINGS

For a better understanding of the nature and objects of some embodiments of the invention, reference should be made to the following detailed description taken in conjunction with the accompanying drawings, in which.

DETAILED DESCRIPTION

Figure 1:
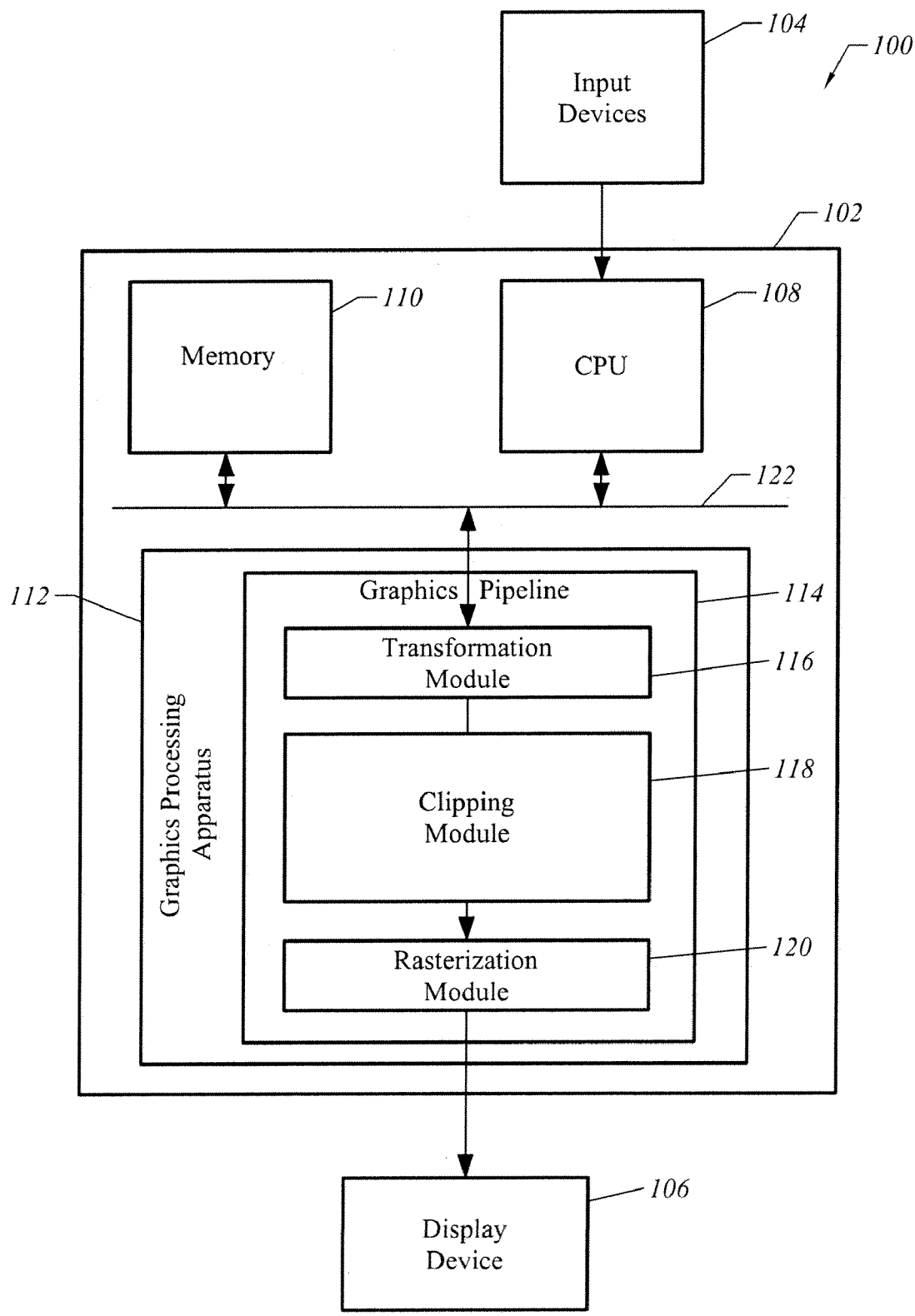
FIG. 1 illustrates a computer system that is implemented in accordance with an embodiment of the invention.

FIG. 1 illustrates a computer system 100 that is implemented in accordance with an embodiment of the invention.

The computer system 100 includes a computer 102, which can be, for example, a desktop computer, a server computer, a laptop computer, a palm-sized computer, a tablet computer, a game console, a portable wireless terminal such as a personal digital assistant or a cellular telephone, a computer-based simulator, or any other device with data processing capability. As illustrated in FIG. 1, the computer 102 is connected to a set of input devices 104, which can include, for example, a keyboard and a mouse. The computer 102 is also connected to a display device 106, which can be, for example, a television set, a Cathode Ray Tube ("CRT") monitor, or a Liquid Crystal Display ("LCD") monitor.

The computer 102 includes a Central Processing Unit ("CPU") 108, which is connected to a memory 110 over a bus 122. The memory 110 can include, for example, a Random Access Memory ("RAM") and a Read Only Memory ("ROM"). As illustrated in FIG. 1, the computer 102 also includes a graphics processing apparatus 112 that is connected to the CPU 108 and the memory 110 over the bus 122. The graphics processing apparatus 112 can be, for example, a Graphics Processing Unit ("GPU").

In the illustrated embodiment, the graphics processing apparatus 112 performs a number of operations to display an object using the display device 106. Referring to FIG. 1, the graphics processing apparatus 112 includes a graphics pipeline 114, which includes a number of modules that are connected to one another and that form different stages of the graphics pipeline 114. In particular, the graphics pipeline 114 includes a transformation module 116, a clipping module 118, and a rasterization module 120. While three modules are illustrated in FIG. 1, it is contemplated that the graphics pipeline 114 can include more or less modules depending on the particular implementation. It is also contemplated that these modules can be combined, sub-divided, or re-ordered for another implementation.

As illustrated in FIG. 1, the transformation module 116 receives a set of graphics primitives that represent the object to be displayed. Each of the graphics primitives is defined by a set of vertices, and each of the vertices has a set of attributes, such as spatial coordinates, color components, fog components, specularity components, and texture coordinates. In the illustrated embodiment, the graphics primitives correspond to polygons. However, it is contemplated that other types of graphics primitives can also be used. Referring to FIG. 1, the transformation module 116 performs a number of transformation operations on the graphics primitives. For example, spatial coordinates of vertices defining the graphics primitives can be rotated, scaled, translated, or converted from one coordinate space into another coordinate space. It is also contemplated that color components, fog components, specularity components, or texture coordinates of the vertices can be modified, such as in connection with lighting operations. The transformation module 116 then delivers the graphics primitives that have been transformed in such manner to the clipping module 118.

Referring to FIG. 1, the clipping module 118 clips the graphics primitives with respect to a set of clipping planes to produce clipped graphics primitives. The clipping module 118 then delivers the clipped graphics primitives to the rasterization module 120. In the illustrated embodiment, the clipping planes define a viewing region, which can be a two-dimensional viewing area or a three-dimensional viewing volume. It is also contemplated that the clipping planes can alternatively, or in conjunction, include a set of model clipping planes, which can be specified by a user to further restrict the viewing region or to remove certain portions of the object from view. The clipping module 118 serves to increase efficiency of the graphics pipeline 114, as further processing on portions of the object that lie outside of the viewing region need not be performed. Also, by using the set of model clipping planes, the clipping module 118 allows portions of the object that were previously hidden from view to be visualized.

Advantageously, the clipping module 118 operates in accordance with an improved technique that allows derivation of certain attributes to be deferred until clipping has been performed with respect to most or all of the clipping planes. In particular, when clipping a graphics primitive with respect to the clipping planes, the clipping module 118 initially derives a partial set of attributes of each new vertex that is produced. As further described herein, this partial set of attributes can correspond to a minimal or optimized set of attributes, and can include spatial coordinates and barycentric coordinates of each new vertex that is produced. Once clipping has been performed with respect to the clipping planes, the clipping module 118 identifies which new vertices, if any, define a clipped graphics primitive and, thus, are to be retained. If a particular new vertex is to be retained, the clipping module 118 derives a remaining set of attributes of that new vertex. As further described herein, this remaining set of attributes can correspond to a majority of attributes of that new vertex, and can be readily derived using barycentric coordinates of that new vertex as interpolation parameters. On the other hand, if a particular new vertex is to be discarded, the clipping module 118 need not derive a remaining set of attributes of that new vertex. By operating in such manner, the clipping module 118 provides enhanced efficiency in terms of avoiding or reducing unnecessary operations that might otherwise be performed, thus resulting in a shorter processing time and a reduced buffering size requirement.

Referring to FIG. 1, the rasterization module 120 performs a number of interpolation operations on the clipped graphics primitives to produce a set of pixels that represent the object to be displayed. For example, spatial coordinates of vertices defining the clipped graphics primitives can be interpolated to assign the pixels that represent the object. It is also contemplated that color components, fog components, specularity components, or texture coordinates of the vertices can be interpolated in connection with pixel assignment. The rasterization module 120 then delivers the pixels for display using the display device 106.

The operation of the clipping module 118 described in connection with FIG. 1 can be further understood with reference to FIG. 2A and FIG. 2B, which illustrate an example of an input graphics primitive 200 that is clipped with respect to a viewing region 202. In the illustrated example, the viewing region 202 is defined by a set of clipping planes, including a right clipping plane 204 and a bottom clipping plane 206. While two clipping planes are illustrated in FIG. 2A and FIG. 2B, it is contemplated that the input graphics primitive 200 can be clipped with respect to more or less clipping planes for another implementation.

Figure 2A:
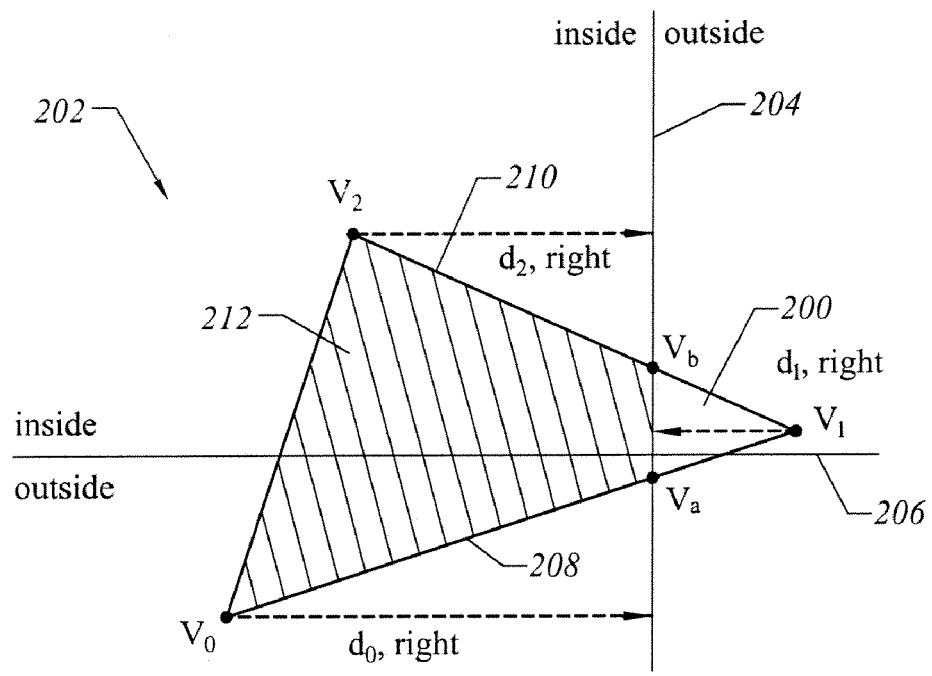
FIG. 2A and FIG. 2B illustrate an input graphics primitive that is clipped in accordance with an embodiment of the invention.
Figure 2B:
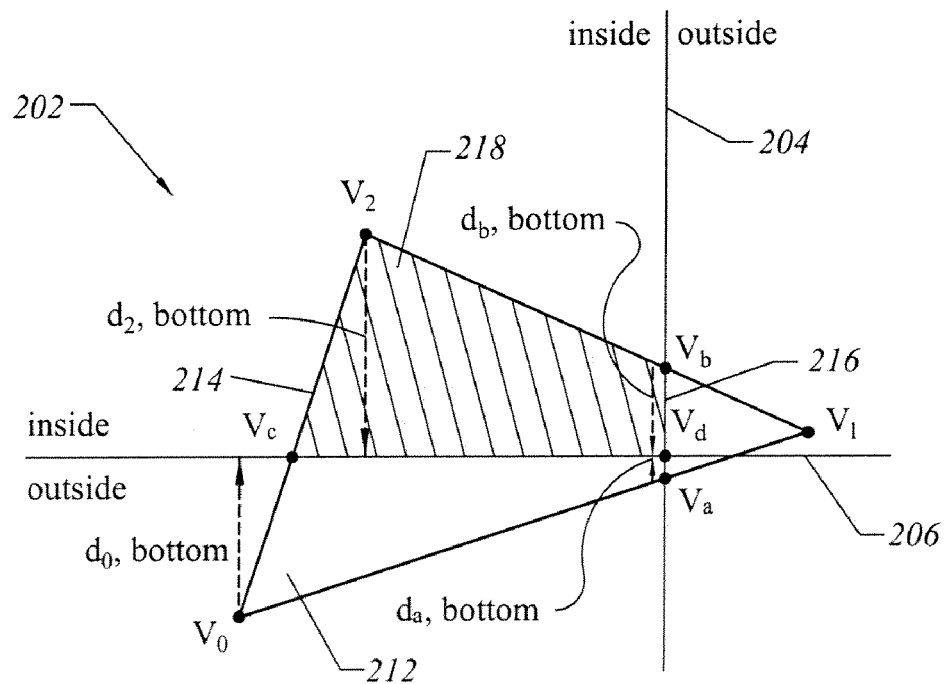

As illustrated in FIG. 2A, the input graphics primitive 200 is defined by input vertices $V_0$, $V_1$, and $V_2$, and the clipping module 118 initially receives each input vertex as having m attributes, including spatial coordinates, color components, fog components, specularity components, and texture coordinates. Here, m is a positive integer, and, for certain implementations, m can be up to 128.

To clip the input graphics primitive 200 with respect to the viewing region 202, the clipping module 118 defines a minimal or optimized set of attributes of each vertex $V_i$ that is involved or produced during clipping of the input graphics primitive 200. In the illustrated example, this minimal set of attributes includes 4 spatial coordinates ($x_i$, $y_i$, $z_i$, $w_i$) in homogenous space as well as 3 barycentric coordinates ($a_i$, $b_i$, $c_i$) of the vertex $V_i$. It is contemplated that the number of spatial coordinates and the number of barycentric coordinates can be different for another implementation. In the illustrated example, barycentric coordinates of a particular vertex $V_i$ correspond to weighting factors defined based on a relative positioning of the vertex $V_i$ with respect to the input vertices $V_0$, $V_1$, and $V_2$. In particular, $a_i$ is a weighting factor defined with respect to the input vertex $V_0$, $b_i$ is a weighting factor defined with respect to the input vertex $V_1$, and $c_i$ is a weighting factor defined with respect to the input vertex $V_2$. When the vertex $V_i$ is positioned at, or close to, one of the input vertices, a barycentric coordinate that is defined with respect to that input vertex is typically assigned a value of one, or close to one, while remaining barycentric coordinates are typically assigned values of zero, or close to zero. When the vertex $V_i$ is not positioned at one of the input vertices, the barycentric coordinates are typically assigned values intermediate between 0 and 1, such that their sum is equal to one. Spatial coordinates and barycentric coordinates of a particular vertex $V_i$ can be referred to as spatial attributes $s_i$ of the vertex $V_i$, while remaining attributes of the vertex $V_i$, such as color components, fog components, specularity components, and texture coordinates, can be referred to as non-spatial attributes $n_i$ of the vertex $V_i$.

Referring to FIG. 2A, the clipping module 118 derives barycentric coordinates of each input vertex to define spatial attributes of that input vertex. In particular, spatial attributes $s_0$ of the input vertex $V_0$ include spatial coordinates ($x_0$, $y_0$, $z_0$, $w_0$) and barycentric coordinates (1, 0, 0), spatial attributes $s_1$ of the input vertex $V_1$ include spatial coordinates ($x_1$, $y_1$, $z_1$, $w_1$) and barycentric coordinates (0, 1, 0), and spatial attributes $s_2$ of the input vertex $V_2$ include spatial coordinates ($x_2$, $y_2$, $z_2$, $w_2$) and barycentric coordinates (0, 0, 1). In the illustrated example, processing next proceeds with respect to the right clipping plane 204 followed by processing with respect to the bottom clipping plane 206. However, it is contemplated that this processing order can be switched for another implementation.

To clip the input graphics primitive 200 with respect to the right clipping plane 204, the clipping module 118 derives a clipping distance of each input vertex with respect to the right clipping plane 204. For example, to clip an edge 208 of the input graphics primitive 200 with respect to the right clipping plane 204, the clipping module 118 derives a clipping distance $d_{0,right}$ of the input vertex $V_0$ as well as a clipping distance $d_{1,right}$ of the input vertex $V_1$. In particular, the clipping distance $d_{0,right}$ is derived based on the spatial coordinates of the input vertex $V_0$ as $w_0+x_0$, and the clipping distance $d_{1,right}$ is derived based on the spatial coordinates of the input vertex $V_1$ as $w_1+x_1$. Once the clipping distances $d_{0,right}$ and $d_{1,right}$ are derived, the clipping module 118 derives spatial attributes $s_a$ of a new vertex $V_a$, which corresponds to an intersection of the edge 208 with respect to the right clipping plane 204. In particular, the spatial attributes $s_a$ of the new vertex $V_a$ include spatial coordinates ($x_a$, $y_a$, $z_a$, $w_a$) and barycentric coordinates ($a_a$, $b_a$, $c_a$), and are derived based on the clipping distances $d_{0,right}$ and $d_{1,right}$ as follows:

$$s_a=(d_{0,right} \cdot s_1 - d_{1,right} \cdot s_0)/(d_{0,right}-d_{1,right}) \tag{I}$$

In a similar fashion, the clipping module 118 derives spatial attributes $s_b$ of a new vertex $V_b$, which corresponds to an intersection of an edge 210 of the input graphics primitive 200 with respect to the right clipping plane 204. In particular, the spatial attributes $s_b$ of the new vertex $V_b$ include spatial coordinates ($x_b$, $y_b$, $z_b$, $w_b$) and barycentric coordinates ($a_b$, $b_b$, $c_b$) and are derived based on a clipping distance $d_{2,right}$ and the clipping distance $d_{1,right}$ as follows:

$$s_b=(d_{2,right} \cdot s_1 - d_{1,right} \cdot s_2)/(d_{2,right}-d_{1,right}) \tag{II}$$

As illustrated in FIG. 2A, a resulting intermediate graphics primitive 212 (shaded in FIG. 2A) is defined by the vertices $V_0$, $V_a$, $V_b$, and $V_2$.

Advantageously, non-spatial attributes $n_a$ of the new vertex $V_a$ and non-spatial attributes $n_b$ of the new vertex $V_b$ need not be derived at this processing stage. In particular, since the new vertex $V_a$ is eventually clipped away, derivation of the non-spatial attributes $n_a$ of the new vertex $V_a$ can be avoided altogether, thereby avoiding or reducing unnecessary interpolation operations that might otherwise be performed. Indeed, a computational saving that can be obtained by avoiding these unnecessary interpolation operations will typically more than offset any additional computational load resulting from the use of barycentric coordinates. Moreover, by simply deriving the spatial attributes $s_a$ and $s_b$ of the new vertices $V_a$ and $V_b$ at this processing stage, a buffering size requirement for the new vertices $V_a$ and $V_b$ is reduced. In particular, if each attribute is a 32 bit word, the buffering size requirement is (7×32) for each of the new vertices $V_a$ and $V_b$, rather than (128×32) for a conventional clipping technique.

Referring to FIG. 2B, the clipping module 118 next clips the intermediate graphics primitive 212 with respect to the bottom clipping plane 206. In a similar fashion as described in connection with the right clipping plane 204, the clipping module 118 derives a clipping distance of each of the vertices $V_0$, $V_a$, $V_b$, and $V_2$ with respect to the bottom clipping plane 206. For example, to clip an edge 214 of the intermediate graphics primitive 212 with respect to the bottom clipping plane 206, the clipping module 118 derives a clipping distance $d_{0,bottom}$ of the input vertex $V_0$ as well as a clipping distance $d_{2,bottom}$ of the input vertex $V_2$. In particular, the clipping distance $d_{0,bottom}$ is derived based on the spatial coordinates of the input vertex $V_0$ as $w_0-y_0$, and the clipping distance $d_{2,bottom}$ is derived based on the spatial coordinates of the input vertex $V_2$ as $w_2-y_2$. Once the clipping distances $d_{0,bottom}$ and $d_{2,bottom}$ are derived, the clipping module 118 derives spatial attributes $s_c$ of a new vertex $V_c$, which corresponds to an intersection of the edge 214 with respect to the bottom clipping plane 206. In particular, the spatial attributes $s_c$ of the new vertex $V_c$ include spatial coordinates ($x_c$, $y_c$, $z_c$, $w_c$) and barycentric coordinates ($a_c$, $b_c$, $c_c$), and are derived based on the clipping distances $d_{0,bottom}$ and $d_{2,bottom}$ as follows:

$$s_c=(d_{0,bottom} \cdot s_2 - d_{2,bottom} \cdot s_0)/(d_{0,bottom}-d_{2,bottom}) \tag{III}$$

In a similar fashion, the clipping module 118 derives spatial attributes $s_d$ of a new vertex $V_d$, which corresponds to an intersection of an edge 216 of the intermediate graphics primitive 212 with respect to the bottom clipping plane 206. In particular, the spatial attributes $s_d$ of the new vertex $V_d$ include spatial coordinates ($x_d$, $y_d$, $z_d$, $w_d$) and barycentric coordinates ($a_d$, $b_d$, $c_d$), and are derived based on a clipping distance $d_{a,bottom}$ and a clipping distance $d_{b,bottom}$ as follows:

$$s_d=(d_{a,bottom} \cdot s_b - d_{b,bottom} \cdot s_a)/(d_{a,bottom}-d_{b,bottom}) \tag{IV}$$

Once clipping has been performed with respect to the right clipping plane 204 and the bottom clipping plane 206, the clipping module 118 identifies which vertices define an output graphics primitive 218 (shaded in FIG. 2B) and, thus, are to be retained. In the illustrated example, the clipping module 118 determines that the vertices $V_b$, $V_2$, $V_c$, and $V_d$ define the output graphics primitive 218 and selects the vertices $V_b$, $V_2$, $V_c$, and $V_d$ for subsequent operations to produce the output graphics primitive 218. Identification of the vertices $V_b$, $V_2$, $V_c$, and $V_d$ can be performed by referencing their clip codes so as to determine their positioning with respect to the viewing region 202. In such fashion, since the new vertex $V_a$ lies outside of the viewing region 202, further interpolation operations for the new vertex $V_a$ can be avoided. Derivation of clip codes can be performed in a conventional fashion and, thus, need not be further described herein.

To produce the output graphics primitive 218, the clipping module 118 derives remaining attributes of each new vertex defining the output graphics primitive 218 so as to issue a complete set of attributes of that new vertex. For example, with respect to the new vertex $V_b$, the clipping module 118 derives the non-spatial attributes $n_b$ of the new vertex $V_b$ by interpolating non-spatial attributes $n_0$, $n_1$, and $n_2$ of the input vertices $V_0$, $V_1$, and $V_2$. In particular, by using the barycentric coordinates ($a_b$, $b_b$, $c_b$) of the new vertex $V_b$ as interpolation parameters, the non-spatial attributes $n_b$ of the new vertex $V_b$ are derived as follows:

$$n_b = (n_0 \cdot a_b + n_1 \cdot b_b + n_2 \cdot c_b) \quad (V)$$

In a similar fashion, the clipping module 118 derives non-spatial attributes $n_c$ of the new vertex $V_c$ and non-spatial attributes $n_d$ of the new vertex $V_d$ as follows:

$$n_c = (n_0 \cdot a_c + n_1 \cdot b_c + n_2 \cdot c_c) \quad (VI)$$

$$n_d = (n_0 \cdot a_d + n_1 \cdot b_d + n_2 \cdot c_d) \quad (VII)$$

Since a complete set of attributes of the input vertex $V_2$ was previously received, the clipping module 118 simply issues the complete set of attributes without performing further interpolation operations for the input vertex $V_2$.

Figure 3:
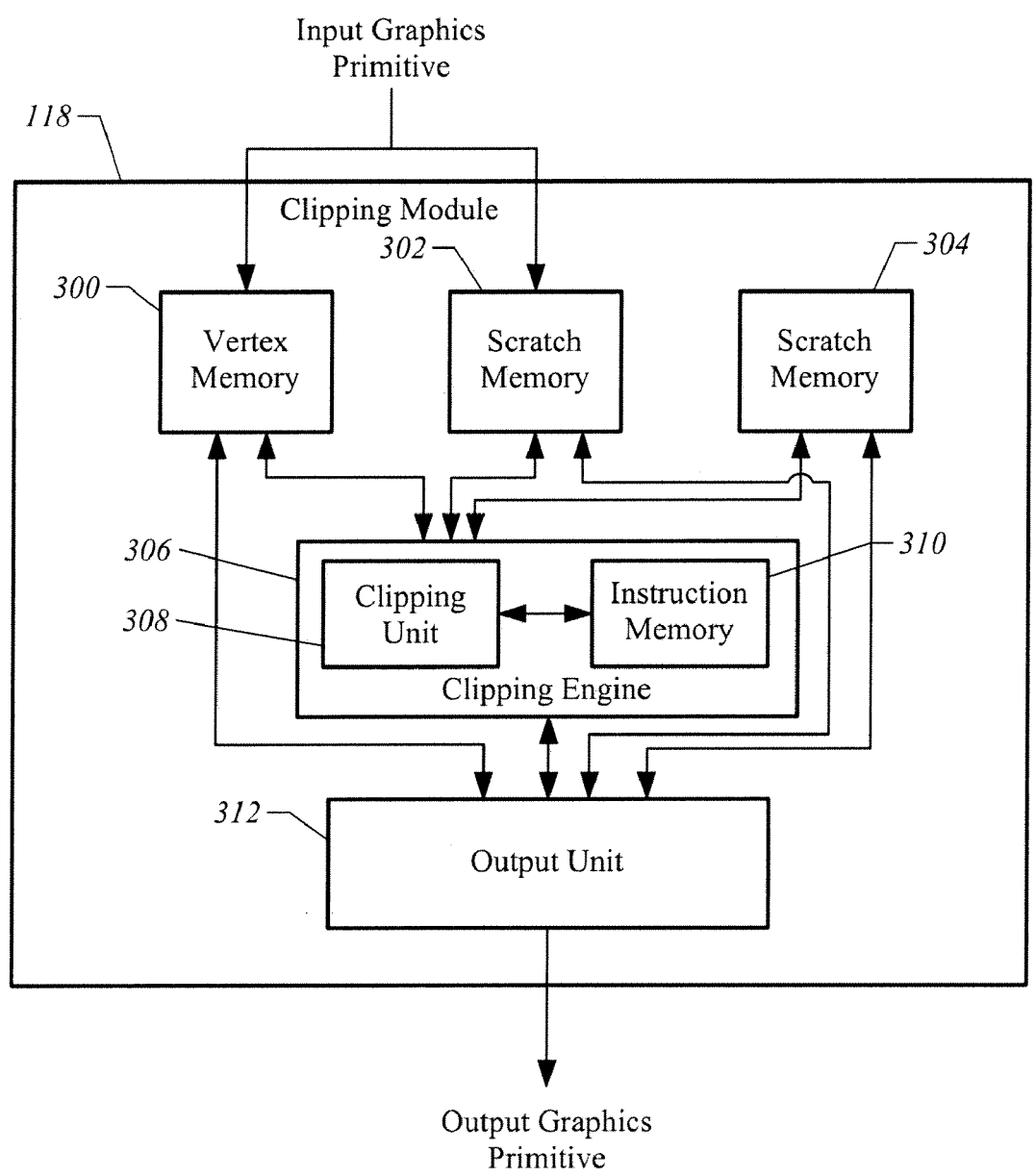
FIG. 3 illustrates a clipping module that is implemented in accordance with an embodiment of the invention.

Attention next turns to FIG. 3, which illustrates the clipping module 118 that is implemented in accordance with an embodiment of the invention. The clipping module 118 includes a vertex memory 300, a scratch memory 302, and a scratch memory 304. Each of the vertex memory 300, the scratch memory 302, and the scratch memory 304 can be implemented using, for example, a RAM that stores data related to clipping of an input graphics primitive. Referring to FIG. 3, the vertex memory 300 receives and stores input vertices defining the input graphics primitive, and each input vertex initially has a number of attributes, such as spatial coordinates, color components, fog components, specularity components, and texture coordinates. In the illustrated embodiment, the scratch memory 302 also receives and stores certain attributes of the input vertices, namely the spatial coordinates of the input vertices.

As illustrated in FIG. 3, the clipping module 118 also includes a clipping engine 306 that is connected to the vertex memory 300, the scratch memory 302, and the scratch memory 304. The clipping engine 306 performs a number of operations to clip the input graphics primitive with respect to a set of clipping planes. In the illustrated embodiment, the clipping engine 306 initially derives barycentric coordinates of the input vertices and delivers the barycentric coordinates to the scratch memory 304 for storage. Next, the clipping engine 306 clips the input graphics primitive with respect to a first one of the clipping planes. For each new vertex that is produced, the clipping engine 306 derives a minimal or optimized set of attributes of that new vertex and delivers this minimal or optimized set of attributes to the scratch memory 302 and the scratch memory 304 for storage. In particular, the clipping engine 306 derives spatial coordinates and barycentric coordinates of each new vertex and delivers the spatial coordinates and the barycentric coordinates to the scratch memory 302 and the scratch memory 304, respectively. In a similar fashion, the clipping engine 306 next clips the input graphics primitive with respect to a second one of the clipping planes, and so on until all relevant clipping planes have been processed. Referring to FIG. 3, the clipping engine 306 is implemented as a micro-coded engine and includes a clipping unit 308 and an instruction memory 310 that is connected to the clipping unit 308. The clipping unit 308 can be implemented using, for example, an arithmetic/multiplication block, and the instruction memory 310 can be implemented using, for example, a ROM that stores computer code for directing operations of the clipping unit 308.

Referring to FIG. 3, the clipping module 118 further includes an output unit 312, which is connected to the vertex memory 300, the scratch memory 302, the scratch memory 304, and the clipping engine 306. Once clipping has been performed with respect to all relevant clipping planes, the output unit 312 identifies which new vertices, if any, define an output graphics primitive and, thus, are to be retained. If a particular new vertex is to be retained, the output unit 312 derives a remaining set of attributes of that new vertex and issues the remaining set of attributes along with either of, or both, spatial coordinates and barycentric coordinates of that new vertex. On the other hand, if a particular new vertex is to be discarded, the output unit 312 need not derive a remaining set of attributes of that new vertex. In the illustrated embodiment, the output unit 312 derives a remaining set of attributes by accessing attributes of the input vertices that are stored in the vertex memory 300 as well as barycentric coordinates of a particular new vertex that are stored in the scratch memory 304. Advantageously, derivation and issuance of the remaining set of attributes can be performed "on the fly," without requiring storage of the remaining set of attributes within the clipping module 118. Referring to FIG. 3, the output unit 312 can be implemented using, for example, a linear interpolator that uses barycentric coordinates of a particular new vertex as interpolation parameters.

It should be appreciated that the specific embodiments of the invention discussed above are provided by way of example, and various other embodiments are encompassed by the invention.

Some embodiments of the invention relate to a computer storage product with a computer-readable medium having computer code thereon for performing various computer-implemented operations. The media and computer code may be those specially designed and constructed for the purposes of the invention, or they may be of the kind well known and available to those having skill in the computer software arts. Examples of computer-readable media include, but are not limited to: magnetic storage media such as hard disks, floppy disks, and magnetic tape; optical storage media such as Compact Disc/Digital Video Discs ("CD/DVDs"), Compact Disc-Read Only Memories ("CD-ROMs"), and holographic devices; magneto-optical storage media such as floptical disks; carrier wave signals; and hardware devices that are specially configured to store and execute program code, such as Application-Specific Integrated Circuits ("ASICs"), Programmable Logic Devices ("PLDs"), and ROM and RAM devices. Examples of computer code include, but are not limited to, machine code, such as produced by a compiler, and files containing higher-level code that are executed by a computer using an interpreter. For example, an embodiment of the invention may be implemented using Java, C++, or other object-oriented programming language and development tools. Additional examples of computer code include, but are not limited to, encrypted code and compressed code.

Some embodiments of the invention can be implemented using computer code in place of, or in combination with, hardwired circuitry. For example, with reference to FIG. 1, various components of the graphics pipeline 114 can be implemented using computer code, hardwired circuitry, or a combination thereof.

While the invention has been described with reference to the specific embodiments thereof, it should be understood by those skilled in the art that various changes may be made and equivalents may be substituted without departing from the true spirit and scope of the invention as defined by the appended claims. In addition, many modifications may be made to adapt a particular situation, material, composition of matter, method, process operation or operations, to the objective, spirit and scope of the invention. All such modifications are intended to be within the scope of the claims appended hereto. In particular, while the methods disclosed herein have been described with reference to particular operations performed in a particular order, it will be understood that these operations may be combined, sub-divided, or re-ordered to form an equivalent method without departing from the teachings of the invention. Accordingly, unless specifically indicated herein, the order and grouping of the operations is not a limitation of the invention.

What is claimed is:

1. A graphics processing apparatus, comprising:
a clipping engine configured to clip an input graphics primitive with respect to a set of clipping planes to derive spatial attributes of new vertices, the set of clipping planes defining a viewing region, the spatial attributes of the new vertices including: (a) barycentric coordinates and spatial coordinates of each of a subset of the new vertices lying inside of the viewing region and (b) barycentric coordinates and spatial coordinates of each of a remaining subset of the new vertices lying outside of the viewing region; and
an output unit connected to the clipping engine, the output unit configured to identify the subset of the new vertices as lying inside of the viewing region, the output unit configured to derive non-spatial attributes of the subset of the new vertices to produce the output graphics primitive.

2. The graphics processing apparatus of claim 1, wherein the input graphics primitive is defined by input vertices, and the clipping engine is configured to derive the spatial attributes of the new vertices based on spatial attributes of the input vertices.

3. The graphics processing apparatus of claim 2, wherein the output unit is configured to derive the non-spatial attributes of the subset of the new vertices based on non-spatial attributes of the input vertices and the barycentric coordinates of the subset of the new vertices.

4. The graphics processing apparatus of claim 3, wherein the non-spatial attributes of the subset of the new vertices include at least one of:
color components of the subset of the new vertices;
fog components of the subset of the new vertices;
specularity components of the subset of the new vertices; and
texture coordinates of the subset of the new vertices.

5. The graphics processing apparatus of claim 1, wherein the output unit is configured to derive the non-spatial attributes of the subset of the new vertices without deriving non-spatial attributes of the remaining subset of the new vertices.

6. The graphics processing apparatus of claim 1, wherein the output graphics primitive is produced with a reduced processing time and a reduced buffering size requirement.

7. A graphics processing apparatus, comprising:
a clipping module configured to:
clip an input graphics primitive with respect to a set of clipping planes to derive spatial attributes of a first new vertex and spatial attributes of a second new vertex, the spatial attributes of the first new vertex including barycentric coordinates and spatial coordinates of the first new vertex, the spatial attributes of the second new vertex including barycentric coordinates and spatial coordinates of the second new vertex;
determine whether the first new vertex defines an output graphics primitive;
based on determining that the first new vertex defines the output graphics primitive, derive remaining attributes of the first new vertex;
determine whether the second new vertex defines the output graphics primitive; and
based on determining that the second new vertex does not define the output graphics primitive, discard the second new vertex without deriving remaining attributes of the second new vertex.

8. The graphics processing apparatus of claim 7, wherein the remaining attributes of the first new vertex correspond to non-spatial attributes of the first new vertex.

9. The graphics processing apparatus of claim 8, wherein the non-spatial attributes of the first new vertex include at least one of:
color components of the first new vertex;
fog components of the first new vertex;
specularity components of the first new vertex; and
texture coordinates of the first new vertex.

10. The graphics processing apparatus of claim 9, wherein the input graphics primitive is defined by input vertices, and the clipping module is configured to derive the non-spatial attributes of the first new vertex by interpolating non-spatial attributes of the input vertices.

11. The graphics processing apparatus of claim 10, wherein the clipping module is configured to interpolate the non-spatial attributes of the input vertices using the barycentric coordinates of the first new vertex as interpolation parameters.

12. A graphics processing apparatus, comprising:
a clipping module configured to:
clip an input graphics primitive with respect to a viewing region to derive spatial attributes of new vertices, the spatial attributes of the new vertices including barycentric coordinates and spatial coordinates of each of the new vertices;
select a subset of the new vertices based on a positioning of the subset of the new vertices with respect to the viewing region;
derive non-spatial attributes of the subset of the new vertices to produce an output graphics primitive; and
discard a remaining subset of the new vertices without deriving non-spatial attributes of the remaining subset of the new vertices.

13. The graphics processing apparatus of claim 12, wherein the input graphics primitive is defined by input vertices, and the clipping module is configured to derive the non-spatial attributes of the subset of the new vertices by interpolating non-spatial attributes of the input vertices using the barycentric coordinates of the subset of the new vertices.

14. The graphics processing apparatus of claim 12, wherein the remaining subset of the new vertices lies outside of the viewing region.

* * * * *